(12) United States Patent
Sljivar et al.

(10) Patent No.: US 9,958,473 B1
(45) Date of Patent: May 1, 2018

(54) CALIBRATING SENSOR UNIT ORIENTATION FOR USE IN A VEHICLE MONITORING SYSTEM

(71) Applicant: SmartDrive Systems, Inc., San Diego, CA (US)

(72) Inventors: Slaven Sljivar, San Diego, CA (US); David Forney, La Jolla, CA (US); Mark Freitas, San Diego, CA (US); Daniel A. Deninger, Carlsbad, CA (US); Jeffrey Griswold, San Diego, CA (US); Jason Palmer, Carlsbad, CA (US)

(73) Assignee: SmartDrive Systems, Inc., San Diego, CA (US)

( * ) Notice: Subject to any disclaimer, the term of this patent is extended or adjusted under 35 U.S.C. 154(b) by 0 days. days.

(21) Appl. No.: 15/583,854

(22) Filed: May 1, 2017

(51) Int. Cl.
| | |
|---|---|
| *G01P 1/04* | (2006.01) |
| *G01P 15/18* | (2013.01) |
| *G01P 21/00* | (2006.01) |
| *G01P 21/02* | (2006.01) |

(52) U.S. Cl.
CPC ............... *G01P 21/00* (2013.01); *G01P 1/04* (2013.01); *G01P 15/18* (2013.01); *G01P 21/02* (2013.01)

(58) Field of Classification Search
CPC .. G01P 1/04; G01P 15/18; G01P 21/00; G01P 21/02
See application file for complete search history.

(56) References Cited

U.S. PATENT DOCUMENTS

| | | | | |
|---|---|---|---|---|
| 7,437,255 | B2 * | 10/2008 | Woodmansee .......... | G01P 21/00 702/95 |
| 7,613,567 | B2 * | 11/2009 | Hashiba .................. | G01P 15/18 702/141 |
| 8,065,104 | B2 * | 11/2011 | Fiedler .................... | G01P 15/18 702/95 |
| 8,589,015 | B2 * | 11/2013 | Willis ..................... | G01P 21/00 701/36 |
| 9,285,294 | B2 * | 3/2016 | Jordan, Jr. .............. | G01P 15/00 |
| 9,581,615 | B2 * | 2/2017 | Basir ....................... | G01P 21/00 |
| 2007/0055468 | A1 * | 3/2007 | Pylvanainen ........... | G01P 21/00 702/92 |
| 2014/0278183 | A1 * | 9/2014 | Zheng ..................... | G01P 21/00 702/96 |
| 2015/0094977 | A1 * | 4/2015 | Dobra ..................... | G01P 21/00 702/104 |
| 2015/0355224 | A1 * | 12/2015 | Greer ...................... | G01P 15/18 702/141 |

* cited by examiner

*Primary Examiner* — Dale W Hilgendorf
(74) *Attorney, Agent, or Firm* — Sheppard Mullin Richter & Hampton LLP (57) ABSTRACT

This disclosure relates to a system and method for calibrating sensors upon installation in a vehicle. The system includes a sensor set configured to generate output signals conveying vectors of acceleration of the vehicle. The system determines a three-dimensional orientation of the sensor set in relation to the vehicle. The system converts output signals from the sensor set into vectors of acceleration of the vehicle.

15 Claims, 4 Drawing Sheets

CALIBRATING SENSOR UNIT ORIENTATION FOR USE IN A VEHICLE MONITORING SYSTEM

FIELD

The systems and methods disclosed herein are related to calibration of sensors upon installation in vehicles, and, in particular, calibration of accelerometers, magnetometers, and gyroscopes used to determine vectors of acceleration, magnetic fields, and rotational motion of a vehicle in one or more directions, such as forward, sideways, or vertically. Upon calibration, an on-board system configured to detect vehicle events may correlate vehicle event data with properly oriented output signals of an accelerometer, a magnetometer, and a gyroscope that are installed in the vehicle.

BACKGROUND

Systems configured to generate, record, store, and transmit sensor data associated with a vehicle are known. Typically, sensor data of a vehicle includes acceleration based on an accelerometer. Accelerometers may be installed in vehicles by manufacturers or by owners after the vehicle is purchased. Vehicle Engine Control Component (ECM) systems are known. Such systems interface/interoperate with external computers (e.g., at an automobile mechanic) where the data stored by the ECM system is analyzed.

SUMMARY

One aspect of the disclosure relates to systems configured to calibrate sensors that have been installed in vehicles. The system may be coupled with and/or otherwise related to a vehicle. The vehicle may have a longitudinal axis and/or other axes. The system may be mounted in and/or otherwise positioned in or on the vehicle. Some or all of the system may be installed in the vehicle and/or be otherwise integrated in the vehicle. Upon calibration, an on-board system configured to detect vehicle events may correlate vehicle event data with properly oriented output signals of an accelerometer, a magnetometer, a gyroscope, and/or other sensors that have been installed in the vehicle.

In some implementations, the system may detect vehicle events based on a comparison of the information conveyed by output signals from sensors to predetermined (variable and/or fixed) values, threshold, functions, and/or other information. The system may detect vehicle events in real-time or near real-time during operation of the vehicle. Detection of vehicle events may be based on one or more current operating conditions of the vehicle. Detection of vehicle events may be based on one or more parameters of the vehicle. In some implementations, detection of a vehicle event includes determination of one or more event types for the detected vehicle event. Vehicle events may include occurrences of circumstances that are of interest to a vehicle operator, a vehicle owner, a fleet manager, and/or other stakeholders. By way of non-limiting example, vehicle events may include speeding, unsafe driving speed, collisions, near-collisions, hard braking, swerving, excessive gas-usage, and/or other events. In some implementations, vehicle events may include the distance between two vehicles being dangerously small, which may for example indicate an increased likelihood of a collision. In some implementations, vehicle events may include one or more driving maneuvers, e.g. in a particular predefined sequence (e.g., a U-turn).

In some implementations, the system may be configured to capture information regarding vehicle events in vehicle event records, which may include video information, audio information, data from an ECM system, metadata, information based on sensor-generated output, and/or other information. In some implementations, the system may be configured to record, store, and/or transmit vehicle event records and/or other information regarding vehicle events and/or sensor-generated information.

The system may be configured to capture information based on operation and/or movement of the vehicle. In some implementations, the system may include a sensor set (including one or more sensors), one or more servers, one or more physical processors, electronic storage, one or more external providers, and/or other components. The sensor set may be configured to generate output signals conveying information related to the vehicle, including but not limited to one or more vectors of acceleration of the vehicle. As used herein, the term "processor" is used interchangeably with the term "physical processor."

A sensor set of a vehicle may have a fixed position and/or orientation relative to the vehicle. The sensor set may have a three-dimensional orientation in relation to the vehicle. In some implementations, the sensor set may include one or more of an accelerometer, a magnetometer, a gyroscope, an altimeter (e.g. a sonic altimeter, a radar altimeter, and/or other types of altimeters), a barometer, a pressure sensor (e.g. a static pressure sensor, a dynamic pressure sensor, a pitot sensor, etc.), a thermometer, an inertial measurement sensor, global positioning system sensors, a tilt sensor, a motion sensor, a vibration sensor, an image sensor, a camera, an ultrasonic sensor, an infrared sensor, a light sensor, a microphone, an air speed sensor, a ground speed sensor, an altitude sensor, medical sensors (including but not limited to blood pressure sensor, pulse oximeter, heart rate sensor, etc.), degree-of-freedom sensors (e.g. 6-DOF and/or 9-DOF sensors), a compass, and/or other sensors. For example, the sensor set may include one or more of a three-axis accelerometer, a three-axis magnetometer, a three-axis gyroscope, and/or other sensors. In some implementations, a sensor set may be physically housed inside a single sensor unit. In some implementations, a sensor set may include one or more sensors that are not included in the sensor unit. For example, a sensor set may include a speed sensor or speedometer that is positioned in a different position within the vehicle than the housing of the sensor unit. In some implementations, the sensor set may be configured to obtain and/or receive output signals and/or other information from other sensors or components that are positioned in the same vehicle or remote from the vehicle.

Individual sensors may be configured to generate output signals conveying information and/or capture information. The information may include visual information, video information, audio information, motion-related information, position-related information, orientation information, depth information, biometric information, geolocation information, and/or other information. In some implementations, the system may determine one or more parameters that are measured, derived, estimated, approximated, and/or otherwise determined based on one or more output signals generated by one or more sensors. In some implementations, at least one of the sensors that is included in the sensor set or coupled with the sensor set may be a vehicle system sensor included in an engine control module (ECM) system or an electronic control module (ECM) system of the vehicle.

As used herein, the term "motion sensor" may include one or more sensors configured to generate output conveying information related to position, location, distance, motion, movement, acceleration, and/or other motion-based parameters. Output signals generated by individual sensors (and/or information based thereon) may be stored and/or transferred in electronic files.

In some implementations, the sensor set may include image sensors, cameras, depth sensors, remote sensors, and/or other sensors. As used herein, the terms "camera" and/or "image sensor" may include any device that captures images, including but not limited to a single lens-based camera, a camera array, a solid-state camera, a mechanical camera, a digital camera, an image sensor, a depth sensor, a remote sensor, a lidar, an infrared sensor, a (monochrome) complementary metal-oxide-semiconductor (CMOS) sensor, an active pixel sensor, and/or other sensors.

Information captured by one or more sensors may be marked, timestamped, annotated, and/or otherwise processed such that information captured by other sensors can be synchronized, aligned, annotated, and/or otherwise associated therewith. For example, video information captured by an image sensor may be synchronized with information captured by an accelerometer or other sensor. Output signals generated by individual image sensors (and/or information based thereon) may be stored and/or transferred in electronic files. In some implementations, a sensor may be integrated with electronic storage such that captured information may be stored in the integrated embedded storage. In some implementations, a sensor may be configured to transfer captured information to remote electronic storage media, e.g. through "the cloud."

The one or more servers may include one or more processors configured to execute one or more computer program components. The computer program components may include one or more of a parameter determination component, a gravity component, a speed component, a longitudinal component, an orientation component, a conversion component, a lateral component, a matrix component, and/or other components.

The parameter determination component may be configured to determine current operating conditions and/or vehicle parameters. The parameter determination component may determine current operating conditions and/or vehicle parameters based on the information conveyed by the output signals from the sensor set and/or other information. The one or more current operating conditions may be related to the vehicle, the operation of the vehicle, physical characteristics of the vehicle, and/or other information. In some implementations, the parameter determination component may be configured to determine one or more of the current operating conditions one or more times in an ongoing manner during operation of the vehicle. In some implementations, the parameter determination component may be configured to determine one or more of the parameters one or more times in an ongoing manner during operation of the vehicle.

The gravity component may be configured to determine gravity vectors and/or other vectors and/or parameters. In some implementations, the gravity component may be configured to determine one or more gravity vectors of a vehicle and/or a sensor set. In some implementations, the gravity component may be configured to determine one or more gravity vectors based on output signals generated by a sensor set. In some implementations, the gravity component may be configured to determine a gravity vector in conjunction with and/or subsequent to determining that a vehicle has stopped, is not moving, has zero speed, is parked, and/or has an otherwise determined exact and specific speed.

In some implementations, the gravity component may obtain, receive, and/or determine a current speed of the vehicle. For example, the sensor set may include a speed sensor configured to generate output signals conveying speed of the vehicle. Alternatively, and/or simultaneously, the sensor set may receive information regarding the speed of the vehicle from an ECM system or ECU of the vehicle. Alternatively, and/or simultaneously, the gravity component may receive information regarding the speed of the vehicle from a system or sensor that is external to the sensor set and/or external to the vehicle.

In some implementations, the gravity component may be configured to determine one or more gravity vectors based on a condition that the current speed of the vehicle is zero. In some implementations, the gravity component may be configured to determine one or more gravity vectors more than twice and/or repeatedly for a duration spanning at least 1, 2, 3, 4, 5, 10, 15, 20, 30, or 60 minutes. In some implementations, the gravity component may be configured to determine one or more gravity vectors more than twice and/or repeatedly for a duration spanning at least 1, 2, 3, 4, 5, 10, 15, 24, 48, or 72 hours. In some implementations, the gravity component may be configured to determine one or more gravity vectors by aggregating multiple previously obtained results.

The speed component may be configured to determine a speed of the vehicle and/or a derivative thereof. Determinations by the speed component may be based on output signals generated by one or more sensors. In some implementations, the speed component may obtain, receive, and/or determine a current speed of the vehicle. In some implementations, the speed component may be configured to compare the speed of the vehicle with a speed threshold. In some implementations, the speed component may be configured to compare the acceleration of the vehicle with an acceleration threshold. Alternatively, and/or simultaneously, in some implementations, the speed component may be configured to compare the deceleration of the vehicle with a deceleration threshold. In some implementations, the magnitude of an acceleration and/or deceleration threshold may be 1, 2, 3, or 4 m/s$^2$. In some implementations, the magnitude of an acceleration and/or deceleration threshold may be 10%, 20%, 30%, or 40% of the standard acceleration due to gravity or g. Determinations by the speed component may be used as conditions for other components of the system.

The longitudinal component may be configured to determine longitudinal vectors and/or other vectors and/or parameters. In some implementations, the longitudinal component may be configured to determine one or more longitudinal vectors of a vehicle and/or a sensor set. In some implementations, the longitudinal component may be configured to determine one or more longitudinal vectors based on output signals generated by a sensor set. In some implementations, the longitudinal component may be configured to determine a longitudinal vector in conjunction with and/or subsequent to determining that a vehicle has a specific deceleration. In some implementations, the longitudinal component may be configured to determine a longitudinal vector by subtracting a gravity vector from a current acceleration vector during a particular condition and/or operation of the vehicle. By way of non-limiting example, the particular condition and/or operation of the vehicle may be an acceleration that breaches an acceleration threshold. Alternatively, and/or simultaneously, by way of non-limiting example, the particular condition and/or operation of the vehicle may be a deceleration that breaches a deceleration threshold.

The orientation component may be configured to determine a three-dimensional orientation of the sensor set in relation to the vehicle. Determinations by the orientation component may be based on the gravity vector, the longitudinal vector, and/or other vectors and/or parameters. In some implementations, determinations by the orientation component may be based on other components of the system, including but not limited to the gravity component, the longitudinal component, the lateral component, the matrix component, and/or other components.

The conversion component may be configured to convert output signals from the sensor set. In some implementations, the output signals may be converted into one or more vectors of acceleration of the vehicle. In some implementations, conversion may be based on the three-dimensional orientation of the sensor set in relation to the vehicle, as determined by the orientation component. In some implementations, conversion may include multiplication of output signals from the sensor set with a matrix. In particular, the multiplication may be based on a matrix that is determined by the matrix component.

The lateral component may be configured to determine one or more lateral vectors of a vehicle and/or a sensor set. In some implementations, a determined lateral vector may be orthogonal to one or both of the gravity vector and the longitudinal vector.

The matrix component may be configured to construct a matrix based on multiple vectors. For example, the matrix component may be configured to construct a rotation matrix based on a set of orthogonal vectors. For example, the rotation matrix may be based on the gravity vector, the longitudinal vector and the lateral vector. In some implementations, the matrix component may be configured to construct a matrix by inverting another matrix. For example, a matrix may be constructed by inverting the rotation matrix.

As used herein, any association (or relation, or reflection, or indication, or correspondency) involving vehicles, sensors, vehicle events, operating conditions, parameters, thresholds, functions, vectors, and/or another entity or object that interacts with any part of the system and/or plays a part in the operation of the system, may be a one-to-one association, a one-to-many association, a many-to-one association, and/or a many-to-many association or N-to-M association (note that N and M may be different numbers greater than 1).

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect. As used herein, the term "determine" (and derivatives thereof) may include measure, calculate, compute, estimate, approximate, generate, and/or otherwise derive, and/or any combination thereof.

These and other objects, features, and characteristics of the servers, systems, and/or methods disclosed herein, as well as the methods of operation and functions of the related elements of structure and the combination of parts and economies of manufacture, will become more apparent upon consideration of the following description and the appended claims with reference to the accompanying drawings, all of which form a part of this disclosure, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
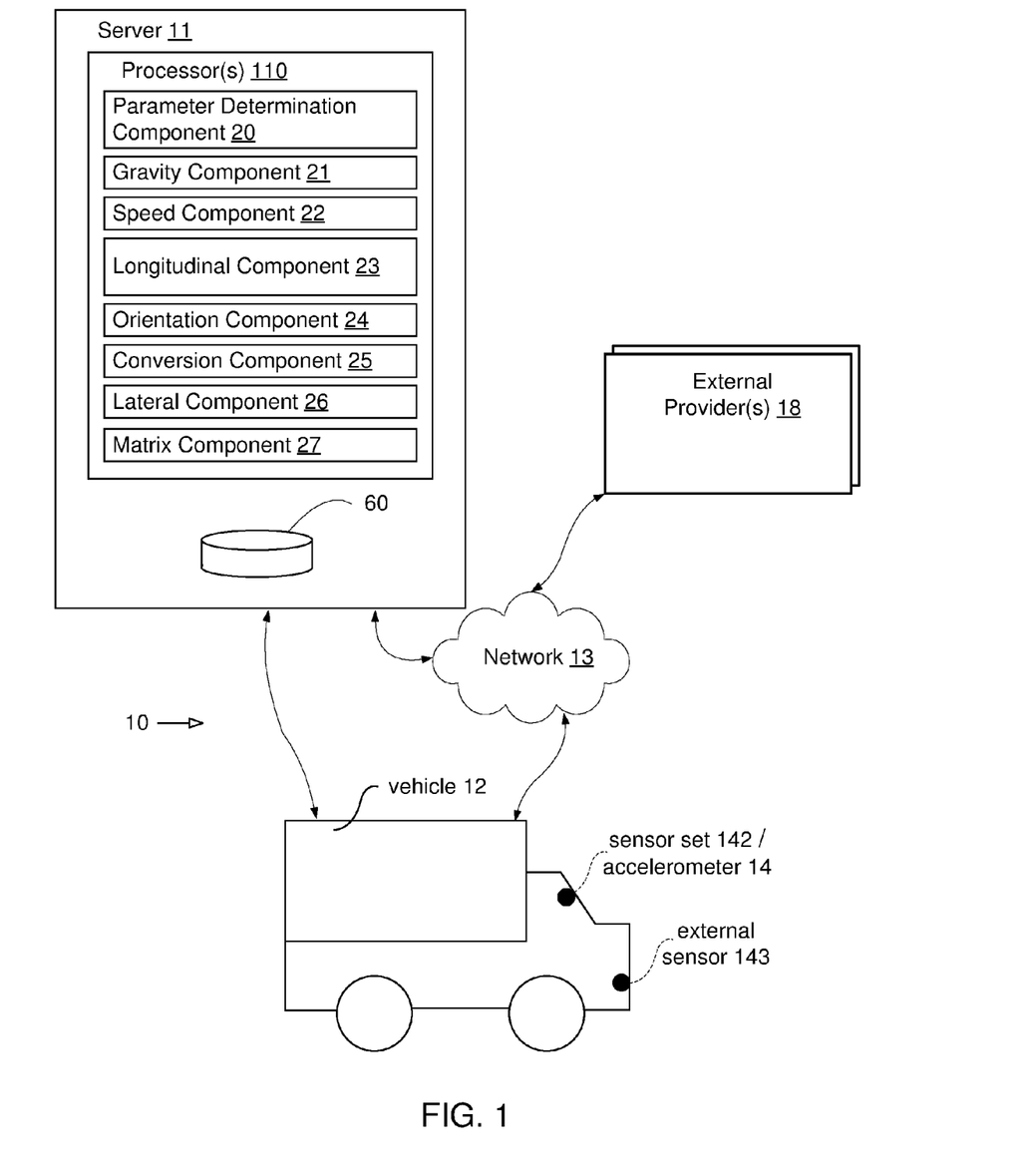
FIG. 1 illustrates a system configured to calibrate an accelerometer upon installation in a vehicle, in accordance with one or more embodiments.

FIG. 1 illustrates a system 10 configured to calibrate an accelerometer 14 upon installation in a vehicle 12. Some or all of system 10 may be installed in vehicle 12, carried by vehicle 12, and/or be otherwise coupled with and/or related to vehicle 12. In some implementations, system 10 may include a sensor set 142, one or more servers 11, one or more physical processors 110, electronic storage 60, a network 13, one or more external providers 18, and/or other components. Sensor set 142 may include accelerometer 14 and/or other sensors. Sensor set 142 may be configured to generate output signals. The output signals may convey information related to vehicle 12, parameters of vehicle 12, and/or current operating conditions of vehicle 12.

Sensor set 142 of vehicle 12 may have a fixed position and/or orientation relative to vehicle 12, which may be unknown and/or uncalibrated upon installation of sensor set 142 into vehicle 12. Sensor set 142 may have a three-dimensional orientation in relation to the three-dimensional orientation of vehicle 12. A three-dimensional orientation may include three orthogonal vectors. Movement and derivatives thereof may be defined relative to a three-dimensional orientation. For example, a vector of acceleration may be defined relative to the vectors of a three-dimensional orientation. In particular, acceleration in any direction may be defined as a combination of up to three orthogonal acceleration vectors.

Figure 2:
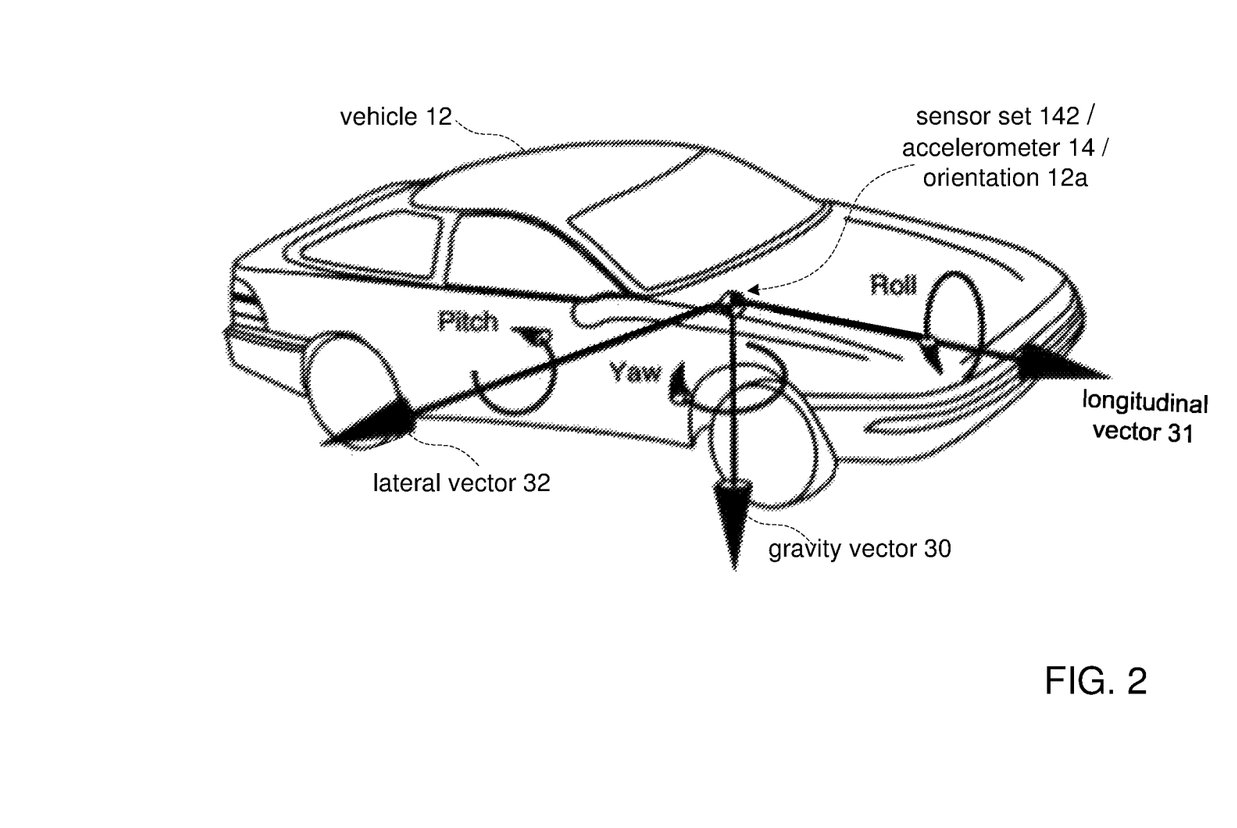
FIG. 2 illustrates an exemplary vehicle having a particular three-dimensional orientation.
Figure 4A:
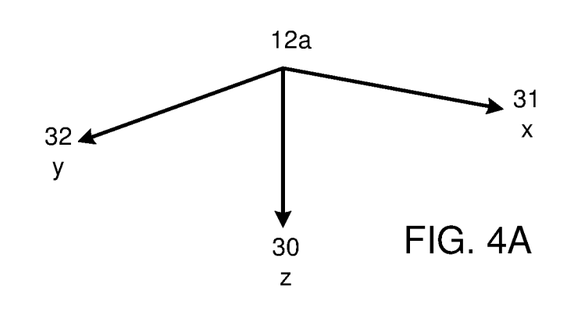
FIGS. 4A-4B-4C illustrate various orientations and/or vectors of acceleration.

Referring to FIG. 2, a three-dimensional orientation 12a of vehicle 12 may include a longitudinal vector 31, a gravity vector 30 and a lateral vector 32. The longitudinal vector (sometimes referred to as "x" or the "x vector") may be oriented in a forward direction. The gravity vector (sometimes referred to as "z" or the "z vector") may be oriented in a downward direction (assuming the vehicle is in a level position) that is orthogonal to the longitudinal vector. The lateral vector (sometimes referred to as "y" or the "y vector") may be oriented in a sideways direction that is orthogonal to both the longitudinal vector and the gravity vector. Referring to FIG. 4A, orientation 12a (of vehicle 12) is depicted as a combination of an x vector 31, a y vector 32, and a z vector 30.

Figure 4B:
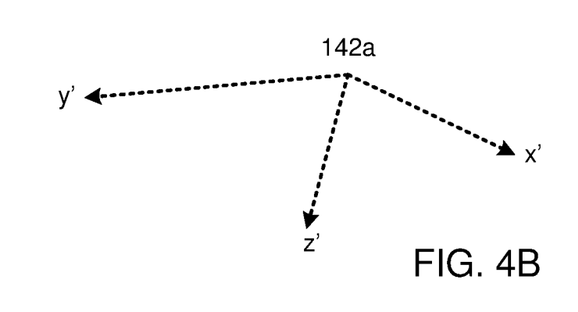
Figure 4C:
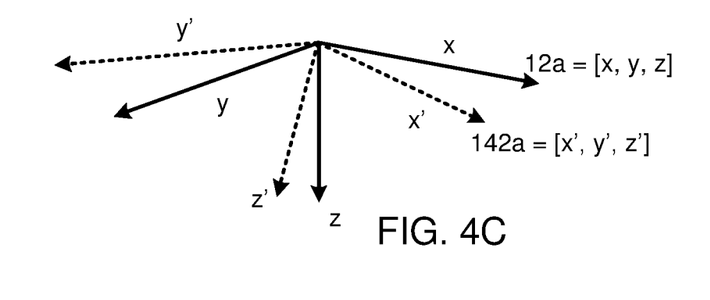

Upon installation in vehicle 12, sensor set 142 may have a three-dimensional orientation 142a (shown in FIG. 4B, including orthogonal vectors x', y', and z') that may be defined by a particular translation or displacement of the three-dimensional orientation 12a of vehicle 12. By way of non-limiting example, FIG. 4B depicts the three-dimensional orientation 142a of sensor set 142 (not shown). Upon installation in vehicle 12, an acceleration of sensor set 142 may have a three-dimensional orientation that is defined by the same particular translation or displacement. Calibration of sensor set 142 may include determining this translation or displacement (from orientation 12a in FIG. 4A to orientation 142a in FIG. 4B). By way of non-limiting example, FIG. 4C depicts a relation between the three-dimensional orientation 142a of sensor set 142 and orientation 12a of vehicle 12. The translation or displacement may be defined as one or more functions to derive [x, y, z]-vectors from [x', y', z'] information, and/or vice versa (e.g. through matrix operations). For example, a measured acceleration of sensor set 142, the [x', y', z'] information or orientation 142a in FIG. 4B, may be used to derive an acceleration of vehicle 12, described as [x, y, z]-vectors or orientation 12a. Conversely, an acceleration of vehicle 12, described as [x, y, z]-vectors or orientation 12a, may be used to derive a corresponding acceleration of sensor set 142, described as [x', y', z'] information or orientation 142a.

Referring to FIG. 1, sensor set 142 may include three-axis accelerometer 14, and/or other sensors. In some implementations, sensor set 142 may be physically housed inside a single sensor unit. In some implementations, sensor set 142 may include one or more sensors that are not included in the sensor unit. For example, sensor set 142 may include a speed sensor or speedometer that is positioned in a different position within vehicle 12 than the housing of the sensor unit. In some implementations, sensor set 142 may be configured to obtain and/or receive output signals and/or other information from other sensors or components that are positioned in vehicle 12 or remote from vehicle 12.

The one or more servers 11 of system 10 may include one or more processors 110 configured to execute one or more computer program components. The computer program components may include one or more of a parameter determination component 20, a gravity component 21, a speed component 22, a longitudinal component 23, an orientation component 24, a conversion component 25, a lateral component 26, a matrix component 27, and/or other components.

Parameter determination component 20 may be configured to determine current operating conditions and/or vehicle parameters. Parameter determination component 20 may determine current operating conditions and/or vehicle parameters based on the information conveyed by the output signals from sensor set 142 and/or other information. The one or more current operating conditions may be related to vehicle 12, the operation of vehicle 12, physical characteristics of vehicle 12, and/or other information. In some implementations, parameter determination component 20 may be configured to determine one or more of the current operating conditions one or more times in an ongoing manner during operation of vehicle 12. In some implementations, parameter determination component 20 may be configured to determine one or more of the parameters one or more times in an ongoing manner during operation of vehicle 12.

Information related to current operating conditions of vehicle 12 may include feedback information from one or more of the mechanical systems of vehicle 12, and/or other information. The mechanical systems of vehicle 12 may include, for example, the engine, the drive train, the lighting systems (e.g., headlights, brake lights), the braking system, the transmission, fuel delivery systems, and/or other mechanical systems. The mechanical systems of vehicle 12 may include one or more mechanical sensors, electronic sensors, and/or other sensors that generate the output signals (e.g., seat belt sensors, tire pressure sensors, etc.). In some implementations, at least one sensor in sensor set 142 may be a vehicle system sensor included in an ECM system of vehicle 12.

In some implementations, sensor set 142 may include one or more video cameras, one or more image sensors, and/or one or more microphones, and/or other sensors. Based on an analysis of images and/or sounds captured, system 10 may determine, using algorithms, that vehicle 12 is moving forward, is in reverse, has maneuvered outside of its lane of traffic, is making a turn, and/or other maneuvers.

In some implementations, information related to current operating conditions of vehicle 12 may include information related to the environment in and/or around vehicle 12. The vehicle environment may include spaces in and around an interior and an exterior of vehicle 12. The information may include information related to movement of vehicle 12, an orientation of vehicle 12, a geographic position of vehicle 12, a spatial position of vehicle 12 relative to other objects, a tilt angle of vehicle 12, an inclination/declination angle of vehicle 12, and/or other information. In some implementations, the output signals conveying information may be generated via non-standard aftermarket sensors installed in vehicle 12. Non-standard aftermarket sensors may include, for example, a video camera, a microphone, an accelerometer, a gyroscope, a geolocation sensor (e.g., a GPS device), a radar detector, a magnetometer, radar (e.g. for measuring distance of leading vehicle), and/or other sensors. In some implementations, sensor set 142 may include multiple cameras positioned around vehicle 12 and synchronized together to provide a 360 degree view of the inside of vehicle 12 and/or a 360 degree view of the outside of vehicle 12.

Although sensor set 142 is depicted in FIG. 1 as a single element, this is not intended to be limiting. Sensor set 142 may include one or more sensors located adjacent to and/or in communication with the various mechanical systems of vehicle 12, in one or more positions (e.g., at or near the front of vehicle 12, at or near the back of vehicle 12, on the side of vehicle 12, on or near the windshield of vehicle 12, facing outward and/or inward, etc.) to accurately acquire information representing the vehicle environment (e.g. visual information, spatial information, orientation information), and/or in other locations. For example, in some implementations, system 10 may be configured such that a first sensor is located near or in communication with a rotating tire of vehicle 12, and a second sensor located on top of vehicle 12 is in communication with a geolocation satellite. In some implementations, sensor set 142 may be configured to generate output signals continuously during operation of vehicle 12.

The physical characteristics of vehicle 12 may include physical features of vehicle 12 set during manufacture of vehicle 12, during loading of vehicle 12, and/or at other times. For example, the one or more vehicle parameters may include a vehicle type (e.g., a car, a bus, a semi-truck, a tanker truck), a vehicle size (e.g., length), a vehicle weight (e.g., including cargo and/or without cargo), a number of gears, a number of axles, a type of load carried by vehicle 12 (e.g., food items, livestock, construction materials, hazardous materials, an oversized load, a liquid), vehicle trailer type, trailer length, trailer weight, trailer height, a number of axles, and/or other physical features.

In some implementations, parameter determination component 20 may be configured to determine one or more vehicle parameters based on the output signals from at least two different sensors. For example, parameter determination component 20 may determine one or more of the vehicle parameters based on output signals from a sensor included in the ECM system and an external sensor 143. In some implementations, a determination of one or more of the vehicle parameters based on output signals from at least two different sensors may be more accurate and/or precise than a determination based on the output signals from a single sensor. For example, on an icy surface, output signals from an accelerometer may not convey that a driver of vehicle 12 is applying the brakes of vehicle 12. However, a sensor in communication with the braking system of vehicle 12 would convey that the driver is applying the brakes. System 10 may determine a value of a braking parameter based on the braking sensor information even though the output signals from the accelerometer may not convey that the driver is applying the brakes.

Parameter determination component 20 may be configured to determine vehicle parameters that are not directly measurable by any of the available sensors. For example, an inclinometer may not be available to measure the road grade, but vehicle speed data as measured by a GPS system and/or by a wheel sensor ECM may be combined with accelerometer data to determine the road grade. If an accelerometer measures a force that is consistent with braking, but the vehicle speed remains constant, parameter determination component 20 may be configured to determine that the measured force is part of the gravity vector that is acting along the longitudinal axis of the vehicle. By using trigonometry, the magnitude of the gravity vector can be used to determine the road grade (e.g., pitch angle of the vehicle in respect to the horizontal plane).

Gravity component 21 may be configured to determine gravity vectors and/or other vectors and/or parameters. In some implementations, gravity component 21 may be configured to determine one or more gravity vectors of vehicle 12 and/or sensor set 142. In some implementations, gravity component 21 may be configured to determine one or more gravity vectors based on output signals generated by sensor set 142. In some implementations, gravity component 21 may be configured to determine a gravity vector in conjunction with and/or subsequent to determining that vehicle 12 has stopped, is not moving, has zero speed, is parked, and/or has an otherwise determined exact and specific speed.

In some implementations, gravity component 21 may obtain, receive, and/or determine a current speed of vehicle 12, and subsequently use that information to determine a gravity vector. For example, sensor set 142 may include a speed sensor configured to generate output signals conveying speed of vehicle 12. Alternatively, and/or simultaneously, sensor set 142 may receive information regarding the speed of vehicle 12 from an ECM system or ECU of vehicle 12. Alternatively, and/or simultaneously, gravity component 21 may receive information regarding the speed of vehicle 12 from a system or sensor that is external to sensor set 142 and/or external to vehicle 12.

In some implementations, gravity component 21 may be configured to determine one or more gravity vectors based on a condition that the current speed of vehicle 12 is zero. For example, if vehicle 12 is stopped or parked, a measured acceleration by sensor set 142 may include acceleration due to gravity, and no longitudinal or lateral acceleration. In some implementations, gravity component 21 may be configured to determine one or more gravity vectors more than twice and/or repeatedly for a duration spanning at least 1, 2, 3, 4, 5, 10, 15, 20, 30, or 60 minutes. In some implementations, gravity component 21 may be configured to determine one or more gravity vectors by aggregating multiple previously obtained results.

Speed component 22 may be configured to determine a speed of vehicle 12 and/or a derivative thereof. Determinations by speed component 22 may be based on output signals generated by one or more sensors. In some implementations, speed component 22 may obtain, receive, and/or determine a current speed of vehicle 12. In some implementations, speed component 22 may be configured to compare the speed of vehicle 12 with a speed threshold. In some implementations, speed component 22 may be configured to compare the acceleration of vehicle 12 with an acceleration threshold. Alternatively, and/or simultaneously, in some implementations, speed component 22 may be configured to compare the deceleration of vehicle 12 with a deceleration threshold. In some implementations, the magnitude of an acceleration and/or deceleration threshold may be 1, 2, 3, or 4 m/s$^2$. In some implementations, the magnitude of an acceleration and/or deceleration threshold may be 10%, 20%, 30%, or 40% of the standard acceleration due to gravity or g. In some implementations, a deceleration threshold may be 0.15 g, 3.3 mph/s, or greater. Determinations by speed component 22 may be used as conditions for other components of system 10.

Longitudinal component 23 may be configured to determine longitudinal vectors and/or other vectors and/or parameters. For example, longitudinal component 23 may be configured to determine a longitudinal acceleration of vehicle 12. In some implementations, the longitudinal acceleration may be positive, e.g., in case vehicle 12 moving forward. Alternatively, and/or simultaneously, the longitudinal acceleration may be negative, e.g., in case vehicle 12 is moving backwards. In some implementations, a negative longitudinal acceleration may be referred to as "braking." In some implementations, the longitudinal acceleration may be exactly opposite to a braking vector of a vehicle moving in a straight line. In some implementations, longitudinal component 23 may be configured to determine one or more longitudinal vectors of vehicle 12 and/or sensor set 142. In some implementations, longitudinal component 23 may be configured to determine one or more longitudinal vectors based on output signals generated by sensor set 142. In some implementations, longitudinal component 23 may be configured to determine a longitudinal vector in conjunction with and/or subsequent to determining that vehicle 12 has at least a specific deceleration. For example, if vehicle 12 is decelerating sufficiently, a measured acceleration by sensor set 142 may include a combination of acceleration due to gravity and longitudinal acceleration, and no or little lateral acceleration. In some implementations, longitudinal component 23 may be configured to determine a longitudinal vector based on a subtraction of a gravity vector from a current acceleration vector during a particular condition and/or operation of vehicle 12. By way of non-limiting example, the particular condition and/or operation of vehicle 12 may be an acceleration that breaches an acceleration threshold. Alternatively, and/or simultaneously, by way of non-limiting example, the particular condition and/or operation of vehicle 12 may be a deceleration that breaches a deceleration threshold. In some implementations, the particular condition and/or operation of vehicle 12 may be detected and/or determined by speed component 22 and/or another component of system 10. In some implementations, longitudinal component 23 may be configured to determine one or more vectors more than twice and/or repeatedly for a duration spanning at least 1, 2, 3, 4, 5, 10, 15, 20, 30, or 60 minutes. In some implementations, longitudinal component 23 may be configured to determine one or more vectors by aggregating multiple previously obtained results.

Orientation component 24 may be configured to determine a three-dimensional orientation of sensor set 142 in relation to vehicle 12. Determinations by orientation component 24 may be based on one or more of a gravity vector, a longitudinal vector, a lateral vector, and/or other vectors and/or parameters. In some implementations, determinations by orientation component 24 may be based on other components of system 10, including but not limited to gravity component 21, longitudinal component 23, lateral component 26, matrix component 27, and/or other components of system 10.

Conversion component 25 may be configured to convert output signals from sensor set 142. In some implementations, the output signals may be converted into one or more vectors of acceleration of vehicle 12. In some implementations, conversion may be based on the three-dimensional orientation of sensor set 142 in relation to vehicle 12, as determined by orientation component 24. In some implementations, conversion may be performed in real-time. In some implementations, the converted output signals from sensor set 142 represent a three-dimensional acceleration relative to orientation 12a of vehicle 12. These converted output signals may be used in other applications of vehicle 12, including but not limited to detection of vehicle events. By virtue of the calibration of sensor set 142 as described in this disclosure, the orientation in which sensor set 142 is mounted in vehicle 12 is not relevant to the subsequent operation of sensor set 142. In some implementations, conversion may include multiplication of output signals from sensor set 142 with a matrix. In particular, the multiplication may be based on a matrix or inverted matrix that is determined by matrix component 27.

Lateral component 26 may be configured to determine one or more lateral vectors of vehicle 12 and/or sensor set 142. In some implementations, a determined lateral vector may be orthogonal to one or both of a gravity vector and a longitudinal vector. For example, lateral component 26 may be configured to perform a cross-product of different vectors (e.g., the gravity vector and the longitudinal vector) to determine a lateral vector. Lateral component 26 may be configured to determine a lateral acceleration of vehicle 12 and/or sensor set 142. In some implementations, a determined lateral acceleration may be orthogonal to one or both of a gravity acceleration and a longitudinal acceleration. In some implementations, determinations by lateral component 26 may include and/or be based on normalizations of vectors. For example, lateral component 26 may be configured to normalize a longitudinal vector based on the magnitude of another vector, e.g., the gravity vector. In some implementations, normalization may be accomplished by dividing a vector by its absolute length. In some implementations, lateral component 26 may be configured to normalize a lateral vector based on the magnitude of another vector, including but not limited to the gravity vector.

Matrix component 27 may be configured to construct a matrix based on multiple vectors. For example, matrix component 27 may be configured to construct a rotation matrix based on a set of orthogonal vectors. For example, the rotation matrix may be based on the gravity vector, the longitudinal vector, and the lateral vector. In some implementations, matrix component 27 may be configured to construct a matrix by inverting another matrix. For example, a matrix may be constructed by inverting the rotation matrix, and subsequently referred to as inverted rotation matrix.

In some implementations, one or more of the vehicle parameters may be determined one or more times in an ongoing manner during operation of vehicle 12. In some implementations, one or more of the vehicle parameters may be determined at regular time intervals during operation of vehicle 12. The timing of the vehicle parameter determinations (e.g., in an ongoing manner, at regular time intervals, etc.) may be programmed at manufacture, obtained responsive to user entry and/or selection of timing information via a user interface and/or a remote computing device, and/or may be determined in other ways. The time intervals of parameter determination may be significantly less (e.g. more frequent) than the time intervals at which various sensor measurements are available. In such cases, system 10 may estimate vehicle parameters in between the actual measurements of the same vehicle parameters by the respective sensors, to the extent that the vehicle parameters are measurable. This may be established by means of a physical model that describes the behavior of various vehicle parameters and their interdependency. For example, a vehicle speed parameter may be estimated at a rate of 20 times per second, although the underlying speed measurements are much less frequent (e.g., four times per second for ECM speed, one time per second for GPS speed). This may be accomplished by integrating vehicle acceleration, as measured by the accelerometer sensor where the measurements are available 1000 times per second, across time to determine change in speed that is accumulated over time again for the most recent vehicle speed measurement. The benefit of these more frequent estimates of vehicle parameters are many and they include improved operation of other components of system 10, reduced complexity of downstream logic and system design (e.g., all vehicle parameters are updated at the same interval, rather than being updating irregularly and at the interval of each respective sensor), and more pleasing (e.g., "smooth") presentation of vehicle event recorder data through an event player apparatus.

Electronic storage 60 may comprise electronic storage media that electronically stores information. The electronic storage media of electronic storage 60 may comprise one or both of system storage that is provided integrally (i.e., substantially non-removable) with system 10 and/or removable storage that is removably connectable to system 10 via, for example, a port (e.g., a USB port, a firewire port, etc.) or a drive (e.g., a disk drive, etc.). Electronic storage 60 may comprise one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 60 may store software algorithms, recorded vehicle event data, information determined by processor 110, information received via a user interface, and/or other information that enables system 10 to function properly. Electronic storage 60 may be (in whole or in part) a separate component within system 10, or electronic storage 60 may be provided (in whole or in part) integrally with one or more other components of system 10.

In some implementations, a remote server may include communication lines, or ports to enable the exchange of information with a network, processor 110 of system 10, and/or other computing platforms. The remote server may include a plurality of processors, electronic storage, hardware, software, and/or firmware components operating together to provide the functionality attributed herein to a remote device. For example, the server may be implemented by a cloud of computing platforms operating together as a system server.

As described above, processor 110 may be configured to provide information-processing capabilities in system 10. As such, processor 110 may comprise one or more of a digital processor, an analog processor, a digital circuit designed to process information, an analog circuit designed to process information, a state machine, and/or other mechanisms for electronically processing information. Although processor 110 is shown in FIG. 1 as a single entity, this is for illustrative purposes only. In some implementations, processor 110 may comprise a plurality of processing units. These processing units may be physically located within the same device (e.g., a vehicle event recorder), or processor 110 may represent processing functionality of a plurality of devices operating in coordination.

Processor 110 may be configured to execute components 20-27 by software; hardware; firmware; some combination of software, hardware, and/or firmware; and/or other mechanisms for configuring processing capabilities on processor 110. It should be appreciated that although components 20-27 are illustrated in FIG. 1 as being co-located within a single processing unit, in implementations in which processor 110 comprises multiple processing units, one or more of components 20-27 may be located remotely from the other components. The description of the functionality provided by the different components 20-27 described herein is for illustrative purposes, and is not intended to be limiting, as any of components 20-27 may provide more or less functionality than is described. For example, one or more of components 20-27 may be eliminated, and some or all of its functionality may be provided by other components 20-27. As another example, processor 110 may be configured to execute one or more additional components that may perform some or all of the functionality attributed below to one of components 20-27.

Figure 3:
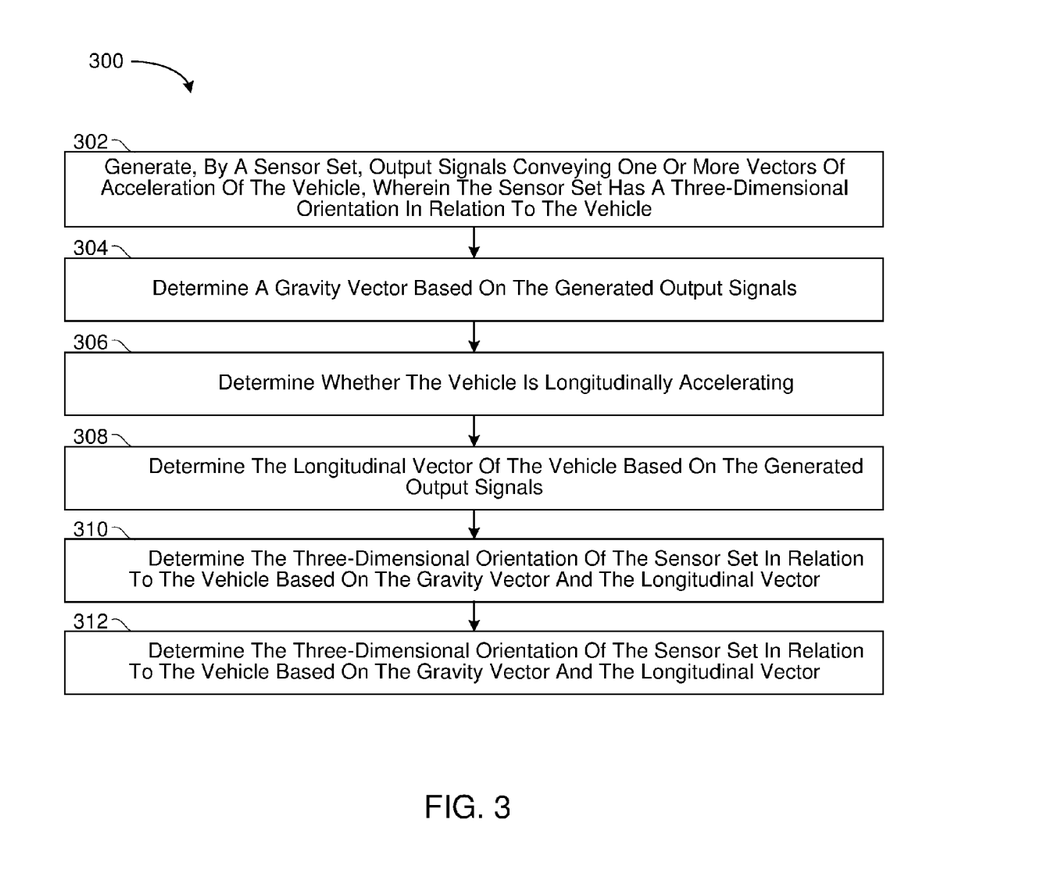
FIG. 3 illustrates a method to calibrate an accelerometer upon installation in a vehicle, in accordance with one or more embodiments.

FIG. 3 illustrates a method 300 to calibrate an accelerometer upon installation in a vehicle, the vehicle having a longitudinal vector. The operations of method 300 presented below are intended to be illustrative. In some implementations, method 300 may be accomplished with one or more additional operations not described, and/or without one or more of the operations discussed. Additionally, the order in which the operations of method 300 are illustrated (in FIG. 3) and described below is not intended to be limiting. In some implementations, two or more of the operations may occur substantially simultaneously.

In some implementations, method 300 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 300 in response to instructions stored electronically on one or more electronic storage mediums. The one or more processing devices may include one or more devices configured through hardware, firmware, and/or software to be specifically designed for execution of one or more of the operations of method 300.

Referring to FIG. 3 and method 300, at an operation 302, output signals are generated by a sensor set include one or more sensors, conveying one or more vectors of acceleration of the vehicle. The sensor set is positioned in or on the vehicle. The sensor set has a three-dimensional orientation in relation to the vehicle. In some embodiments, operation 302 is performed by a sensor set the same as or similar to sensor set 142 (shown in FIG. 1 and described herein).

At an operation 304, a gravity vector is determined based on the generated output signals. In some embodiments, operation 304 is performed by a gravity component the same as or similar to gravity component 21 (shown in FIG. 1 and described herein).

At an operation 306, the system determines whether the vehicle is longitudinally accelerating. In some implementations, the particular longitudinal acceleration may be negative, e.g., in case the vehicle is braking. In some embodiments, operation 306 is performed by a speed component the same as or similar to speed component 22 (shown in FIG. 1 and described herein).

At an operation 308, responsive to a determination that the vehicle is longitudinally accelerating (or braking), the longitudinal vector of the vehicle is determined based on the generated output signals. In some embodiments, operation 308 is performed by a longitudinal component the same as or similar to longitudinal component 23 (shown in FIG. 1 and described herein).

At an operation 310, the three-dimensional orientation of the sensor set in relation to the vehicle is determined. Determining the three-dimensional orientation is based on the gravity vector and the longitudinal vector. In some embodiments, operation 310 is performed by an orientation component the same as or similar to orientation component 24 (shown in FIG. 1 and described herein).

At an operation 312, output signals generated by the sensor set are converted into one or more vectors of acceleration of the vehicle. Converting is based on the three-dimensional orientation of the sensor set in relation to the vehicle. In some embodiments, operation 312 is performed by a conversion component the same as or similar to conversion component 25 (shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system configured to calibrate orientation of an accelerometer upon installation in a vehicle, the system configured to couple with the vehicle, the system comprising:

a sensor set including one or more sensors, wherein the sensor set is configured to generate output signals conveying one or more vectors of acceleration of the vehicle, wherein the sensor set is positioned in or on the vehicle, wherein the sensor set has a three-dimensional orientation in relation to the vehicle, wherein the sensor set includes a speed sensor configured to generate a signal conveying speed of the vehicle;

one or more processors configured to:

determine that the vehicle is stopped based on the signal generated by the speed sensor;

determine a gravity vector based on the generated output signals and further based on the determination that the vehicle is stopped;

determine a rate of current speed change of the vehicle, based on the signal generated by the speed sensor;

compare the rate of current speed change with a speed change threshold level to determine whether a magnitude of the rate of current speed change is sufficient to assume the vehicle is not turning left or right but moving in a straight line;

determine whether the vehicle is longitudinally accelerating and not turning left or right responsive to a determination that the magnitude of the rate of current speed change has breached the speed change threshold level for at least a specified duration;

responsive to a determination that the vehicle is longitudinally accelerating and not turning left or right, determine a longitudinal vector of the vehicle based on the generated output signals;

determine the three-dimensional orientation of the sensor set in relation to the vehicle, wherein determination of the three-dimensional orientation is based on the gravity vector and the longitudinal vector; and convert output signals generated by the sensor set into one or more vectors of acceleration of the vehicle, wherein conversion is based on the three-dimensional orientation of the sensor set in relation to the vehicle.

2. The system of claim 1, wherein the speed change threshold level corresponds to at least 0.1 g.

3. The system of claim 1, wherein the one or more processors are further configured to determine a current acceleration vector during a duration when the vehicle has been determined to be longitudinally accelerating, and wherein determining the longitudinal vector includes a subtraction of the gravity vector from the current acceleration vector.

4. The system of claim 1, wherein the one or more processors are further configured to:

determine a lateral vector that is orthogonal to both the gravity vector and the longitudinal vector;

construct a rotation matrix based on the gravity vector, the longitudinal vector, and the lateral vector; and invert the rotation matrix, wherein determining the three-dimensional orientation of the sensor set in relation to the vehicle is based on the inverted rotation matrix.

5. The system of claim 4, wherein determination of the lateral vector includes normalization of the longitudinal vector and performance of a cross product of the gravity vector and the longitudinal vector.

6. The system of claim 4, wherein conversion of the output signals includes multiplication of the output signals of the sensor set with the inverted rotation matrix.

7. The system of claim 1, wherein determination of the gravity vector is performed more than twice and results of the determination are aggregated.

8. The system of claim 1, wherein determination of the longitudinal vector is performed repeatedly for a duration spanning at least 10 minutes and results of the determination are aggregated.

9. The system of claim 1, wherein the one or more vectors of acceleration of the vehicle include three orthogonal vectors of acceleration.

10. The system of claim 1, wherein the sensor set includes the accelerometer.

11. The system of claim 1, wherein the sensor set includes the accelerometer and a magnetometer.

12. The system of claim 1, wherein the sensor set includes a three-axis accelerometer, a three-axis magnetometer, and a three-axis gyroscope.

13. A method to calibrate orientation of an accelerometer upon installation in a vehicle, the method comprising:

generating, by a sensor set include one or more sensors, output signals conveying one or more vectors of acceleration of the vehicle, wherein the sensor set is positioned in or on the vehicle, wherein the sensor set has a three-dimensional orientation in relation to the vehicle, wherein the sensor set includes a speed sensor that generates a signal conveying speed of the vehicle;

determine that the vehicle is stopped based on the signal generated by the speed sensor;

determining a gravity vector based on the generated output signals and further based on the determination that the vehicle is stopped;

determining a rate of current speed change of the vehicle, based on the signal generated by the speed sensor;

comparing the rate of current speed change with a speed change threshold level to determine whether a magnitude of the rate of current speed change is sufficient to assume the vehicle is not turning left or right but moving in a straight line;

determining whether the vehicle is longitudinally accelerating and not turning left or right responsive to a determination that the magnitude of the rate of current speed change has breached the speed change threshold level for at least a specified duration;

responsive to determining that the vehicle is longitudinally accelerating and not turning left or right, determining a longitudinal vector of the vehicle based on the generated output signals;

determining the three-dimensional orientation of the sensor set in relation to the vehicle, wherein determining the three-dimensional orientation is based on the gravity vector and the longitudinal vector; and converting output signals generated by the sensor set into one or more vectors of acceleration of the vehicle, wherein converting is based on the three-dimensional orientation of the sensor set in relation to the vehicle.

14. The method of claim 13, further comprising:

determining a lateral vector that is orthogonal to the gravity vector and the longitudinal vector;

constructing a rotation matrix based on the gravity vector, the longitudinal vector, and the lateral vector; and inverting the rotation matrix, wherein determining the three-dimensional orientation of the sensor set in relation to the vehicle is based on the inverted rotation matrix, and wherein converting the output signals includes multiplying the output signals of the sensor set with the inverted rotation matrix.

15. A system configured to calibrate orientation of an accelerometer upon installation in a vehicle, the system configured to couple with the vehicle, the system comprising:

a sensor set including one or more sensors, wherein the sensor set is configured to generate output signals conveying one or more vectors of acceleration of the vehicle, wherein the sensor set is positioned in or on the vehicle, wherein the sensor set has a three-dimensional orientation in relation to the vehicle, wherein the sensor set includes a speed sensor configured to generate a signal conveying speed of the vehicle;

one or more processors configured to:
- determine that the vehicle is stopped based on the signal generated by the speed sensor;
- determine a gravity vector based on the generated output signals and further based on the determination that the vehicle is stopped;
- determine a rate of current speed change of the vehicle, based on the signal generated by the speed sensor;
- compare the rate of current speed change with a speed change threshold level to determine whether a magnitude of the rate of current speed change is sufficient to assume the vehicle is not turning left or right but moving in a straight line;
- make a first determination whether the magnitude of the rate of current speed change has breached the speed change threshold level for a duration that exceeds a specified duration threshold;
- responsive to the first determination, make a second determination whether the vehicle is longitudinally accelerating and not turning left or right;
- responsive to the second determination that the vehicle is longitudinally accelerating and not turning left or right, determine a longitudinal vector of the vehicle based on the generated output signals;
- determine the three-dimensional orientation of the sensor set in relation to the vehicle, wherein determination of the three-dimensional orientation is based on the gravity vector and the longitudinal vector; and
- convert output signals generated by the sensor set into one or more vectors of acceleration of the vehicle, wherein conversion is based on the three-dimensional orientation of the sensor set in relation to the vehicle.

* * * * *